US009484018B2

(12) United States Patent
Bocchieri et al.

(10) Patent No.: US 9,484,018 B2
(45) Date of Patent: Nov. 1, 2016

(54) SYSTEM AND METHOD FOR BUILDING AND EVALUATING AUTOMATIC SPEECH RECOGNITION VIA AN APPLICATION PROGRAMMER INTERFACE

(75) Inventors: Enrico Bocchieri, Chatham, NJ (US); Dimitrios Dimitriadis, Jersey City, NJ (US); Horst J. Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1181 days.

(21) Appl. No.: 12/952,829

(22) Filed: Nov. 23, 2010

(65) Prior Publication Data
US 2012/0130709 A1 May 24, 2012

(51) Int. Cl.
*G10L 15/06* (2013.01)
*G10L 15/065* (2013.01)
*G10L 15/30* (2013.01)

(52) U.S. Cl.
CPC ............ *G10L 15/063* (2013.01); *G10L 15/065* (2013.01); *G10L 15/30* (2013.01)

(58) Field of Classification Search
CPC .... G10L 15/30; G10L 15/063; G10L 15/065
USPC ................................ 704/251, 256, 270, 275
See application file for complete search history.

(56) References Cited

U.S. PATENT DOCUMENTS

| | | | | |
|---|---|---|---|---|
| 5,956,683 A * | 9/1999 | Jacobs | ............... | G10L 15/02 704/201 |
| 5,960,399 A * | 9/1999 | Barclay | ............... | G10L 15/02 370/349 |
| 6,363,348 B1 * | 3/2002 | Besling et al. | ............ | 704/270.1 |
| 6,408,272 B1 * | 6/2002 | White et al. | ............... | 704/270.1 |
| 6,442,519 B1 * | 8/2002 | Kanevsky et al. | ............ | 704/243 |
| 6,456,974 B1 * | 9/2002 | Baker et al. | ............... | 704/270.1 |
| 6,463,413 B1 * | 10/2002 | Applebaum et al. | ...... | 704/256.2 |
| 6,633,846 B1 * | 10/2003 | Bennett et al. | ............... | 704/257 |
| 6,766,295 B1 * | 7/2004 | Murveit et al. | ............... | 704/243 |
| 6,823,306 B2 * | 11/2004 | Reding et al. | ............... | 704/244 |
| 6,856,960 B1 * | 2/2005 | Dragosh et al. | ............ | 704/270.1 |
| 6,934,682 B2 * | 8/2005 | Woodward | ............. | 704/250 |
| 7,756,708 B2 * | 7/2010 | Cohen et al. | ................ | 704/244 |
| 2002/0091511 A1 * | 7/2002 | Hellwig et al. | ............... | 704/201 |
| 2002/0138274 A1 * | 9/2002 | Sharma et al. | ............... | 704/270 |

(Continued)

OTHER PUBLICATIONS

Mark Gales, "Acoustic Modelling for Speech Recognition: Hidden Markov Models and Beyond?", Cambridge University Engineering Department, 2009.*

*Primary Examiner* — Jialong He (57) ABSTRACT

Disclosed herein are systems, methods, and non-transitory computer-readable storage media for building an automatic speech recognition system through an Internet API. A network-based automatic speech recognition server configured to practice the method receives feature streams, transcriptions, and parameter values as inputs from a network client independent of knowledge of internal operations of the server. The server processes the inputs to train an acoustic model and a language model, and transmits the acoustic model and the language model to the network client. The server can also generate a log describing the processing and transmit the log to the client. On the server side, a human expert can intervene to modify how the server processes the inputs. The inputs can include an additional feature stream generated from speech by algorithms in the client's proprietary feature extraction.

20 Claims, 4 Drawing Sheets

(56) References Cited

U.S. PATENT DOCUMENTS

| | | | |
|---|---|---|---|
| 2003/0050783 A1* | 3/2003 | Yoshizawa | 704/270.1 |
| 2003/0120493 A1* | 6/2003 | Gupta | 704/270.1 |
| 2004/0111259 A1* | 6/2004 | Miller | G10L 15/19 704/231 |
| 2005/0102142 A1* | 5/2005 | Soufflet et al. | 704/246 |
| 2006/0053009 A1* | 3/2006 | Jeong et al. | 704/234 |
| 2008/0228480 A1* | 9/2008 | Maegawa | 704/235 |
| 2008/0288252 A1* | 11/2008 | Cerra | G10L 15/30 704/244 |
| 2009/0240499 A1* | 9/2009 | Dvir et al. | 704/246 |
| 2010/0195806 A1* | 8/2010 | Zhang | H04M 3/42153 379/88.01 |
| 2011/0296374 A1* | 12/2011 | Wu | G06F 17/2715 717/104 |

\* cited by examiner

SYSTEM AND METHOD FOR BUILDING AND EVALUATING AUTOMATIC SPEECH RECOGNITION VIA AN APPLICATION PROGRAMMER INTERFACE

BACKGROUND

1. Technical Field

The present disclosure relates to speech recognition and more specifically to generating natural language models for use in speech recognition.

2. Introduction

To most users, an automatic speech recognizer (ASR) appears as a "black box" that accepts a speech signal as input, such as from a microphone, and that outputs the corresponding textual transcription. However, the speech recognizer includes several components such as the acoustic (feature extraction) front-end, the acoustic model, the language model, and various decoding algorithms. These components require training and/or calibration on large-amounts of application-specific speech and textual data for the recognizer to provide competitive, state-of-the-art accuracy for transcriptions of the speech signal. The training processes require expertise, computing infrastructure, and significant amounts of time.

Traditionally, speech recognition training is performed for clients via one of two methods. In the first method, a speech recognition company provides the entire speech recognition system (not just the recognizer) to the client. This approach raises intellectual property issues such as licensing, trade secrets, patent rights, copyright, and so forth for the speech recognition company, provider, or owner of the ASR engine. This approach is also expensive and does not scale well because it forces engine developers to maintain backward compatibility with several versions delivered to different clients or to devote special teams of developers to each different version.

In the second method, the client provides its own data and/or algorithm, and the speech recognition company trains the ASR models and evaluates the corresponding recognition accuracy. This is expensive for the speech recognition company. Further, the client exposes its intellectual property to the speech recognition company. This approach may raise concerns regarding the privacy of their potentially sensitive data or regarding unauthorized sharing of the speech data the client has spent so much time, effort, and money to develop.

Due to the limitations and intellectual property concerns of these approaches, a client and an ASR service provider may not cooperate at all or may not cooperate with the trust and cooperation necessary to recognize speech at a level of quality that would otherwise be possible.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Instead of the two alternatives set forth above, one implementation of the approaches disclosed herein is an Internet-based application programmer interface (API) to a server that provides clients with the model training/evaluation functionalities without physical access to or even knowledge of the algorithmic implementation. The internal workings of the ASR system are not visible directly to the clients, but are accessible via secure ports for communication. The approaches disclosed herein provide a way for potential clients who are deploying their own application using an ASR system to access the "functionalities" of the ASR system without revealing to them unnecessary technical details or advanced tuning parameters. The clients can assess the recognition accuracy using models and algorithmic components that have been trained on their own application data or algorithms.

In speech recognition, distributed speech recognition refers to performing feature extraction on the client's handset (rather than on the server) and sent to the server through a communication channel for decoding. Instead, the purpose of the approaches disclosed herein is to provide a web-based platform for model training and evaluation/recognition, where the client has control over the process.

Disclosed are systems, methods, and non-transitory computer-readable storage media for generating speech models from the perspective of a server and from a client device. The server receives a standard feature stream and/or an optional proprietary feature stream, transcriptions, and parameter values as inputs from a network client independent of and/or without access to or specific knowledge of internal operations of the automatic speech recognition system. However, the network client may have general knowledge of the available tools and functionalities via the API. The system processes the inputs to train an acoustic model and a language model. Then the server transmits the acoustic model and the language model to the network client. The client communicates with the server via an API. The client provides text, such as transcriptions of the input speech. The input speech can be recorded live from a user or can be selected from a database of previously recorded speech. The client device extracts features from the input speech and the input text based on configuration parameters and transmits, via an API call, the features, the input speech, the input text, and configuration parameter values to the server. Later, the client receives from the server an acoustic model and a language model generated based on the features or the input speech, the input text, and the configuration parameter values.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for two entities to cooperate in making acoustic and/or language models for speech recognition without revealing or compromising intellectual property and/or other sensitive information. A brief introductory description of a basic general purpose system or computing device is provided with respect to FIG. 1 which can be employed to practice the concepts disclosed herein. A more detailed description of this approach will then follow. These and other variations shall be discussed herein as the various embodiments are set forth. The disclosure now turns to FIG. 1.

Figure 1:
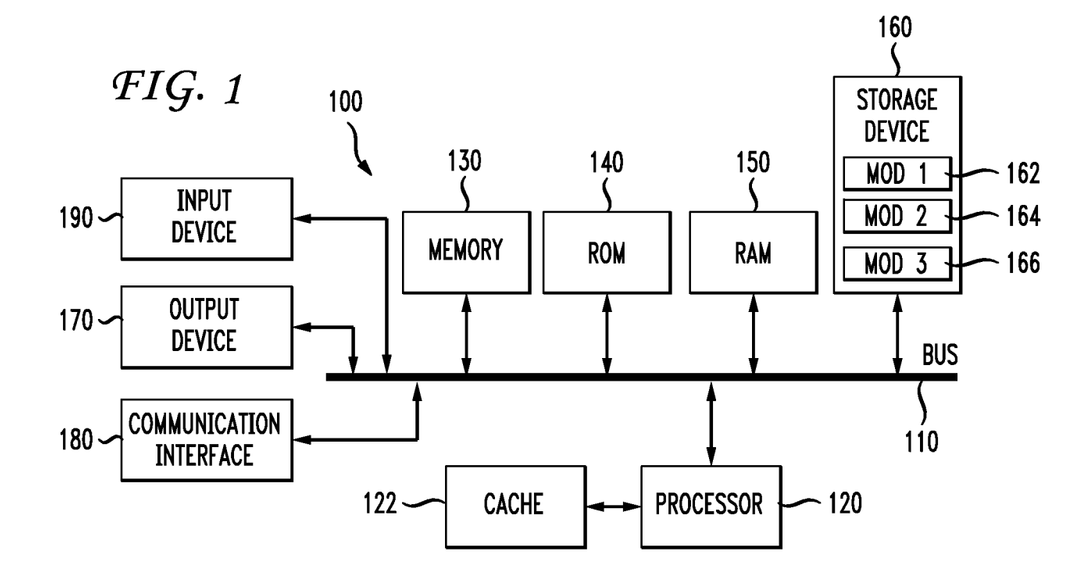
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
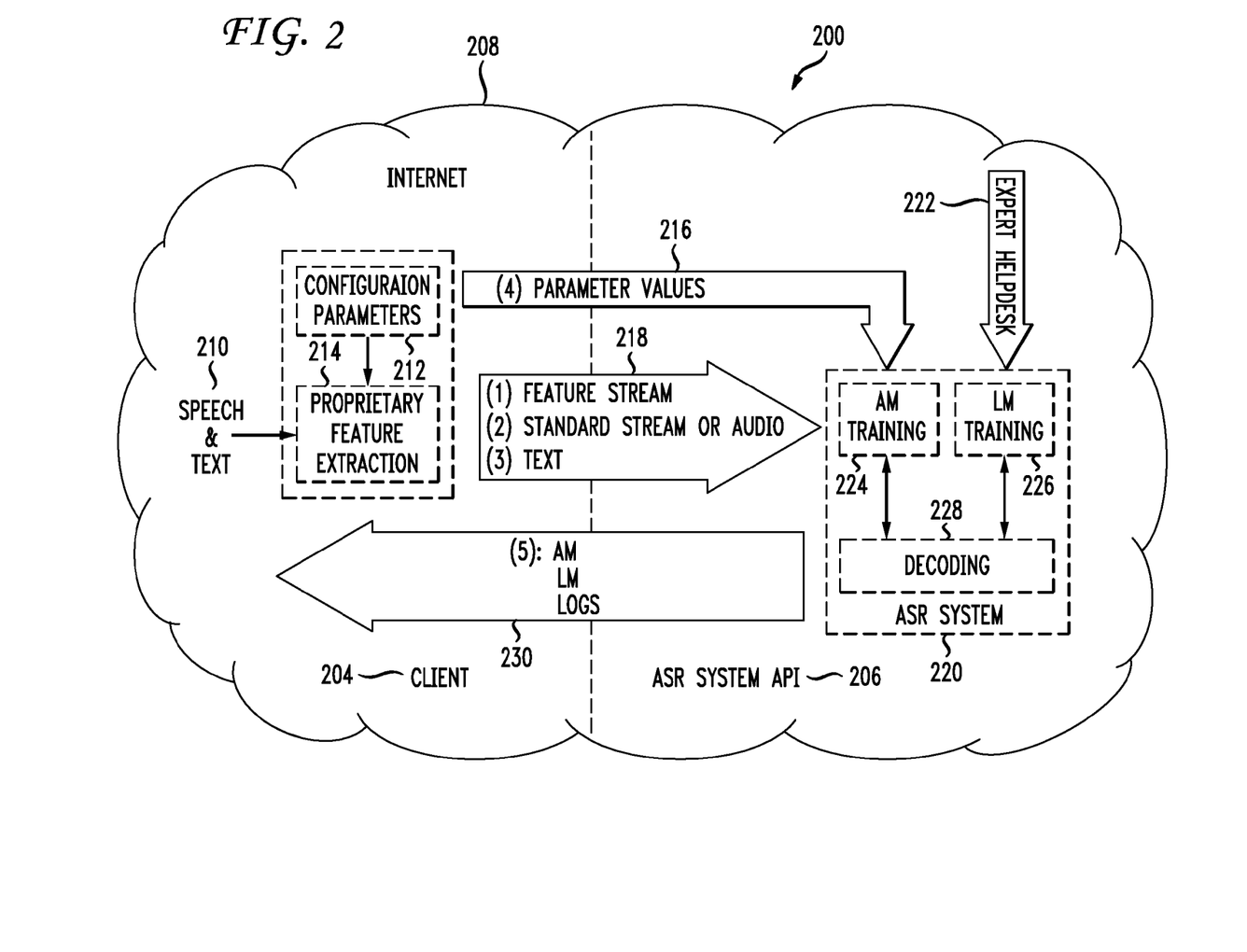
FIG. 2 illustrates an example system implementation of an automatic speech recognition application programming interface with a clear separation between the client and the engine provider.

Having disclosed some basic system components, the disclosure now returns to a discussion of generating acoustic and/or language models for use in speech recognition. FIG. 2 illustrates an example system implementation 200 of an automatic speech recognition API with a clear separation between the client 204 and the ASR system API 206 or engine provider. The client can be a small or medium business that wants to implement a speech recognizer but does not have resources to produce its own ASR models, but has its own speech and transcription samples for the desired speech recognition tasks. The ASR system 220 provider can be an entity that has invested heavily in speech model generation algorithms and processes. Neither the client 204 nor the ASR system 220 provider desires to expose its investment to the other, so they communicate via an API 206 to generate the language models without exposing any sensitive information. The client 204 and the ASR system 220 can communicate via the Internet 208 or other suitable network or other communication mechanism. The API 206 can support full training and evaluation of speech acoustic and language models in a self-service mode for the client 204, but can also allow for human intervention as part of an Expert Helpdesk 222 on the ASR system 220 side.

In this model, the client 204 takes in speech and text 210 such as transcriptions of the speech, and uses configuration parameters to perform proprietary and/or standard feature extraction 214 on the speech and text 210 so that the ASR system 220 is not privy to the details of the proprietary feature extraction 214. The model shown in FIG. 2 keeps the client's proprietary and/or sensitive information and intellectual property separate from that of the ASR system 220. The Internet-based API 206 that provides the client 204 with the model training and evaluation functionalities without requiring physical or other direct access to the algorithmic implementation in the ASR system 220 side. The ASR system 220 is not visible directly to the clients but the API 206 defines ports or channels for communication.

The client 204 communicates a first set of inputs 218 including an optional feature stream generated from speech by algorithms in the client's proprietary feature extraction 214, standard stream or audio, and text transcriptions of the feature stream, and a set of parameter values 216 that describe the settings of the proprietary feature extraction 214. The standard stream is a stream of "standard ASR features" that the client generates from speech using the supplied baseline feature extraction program, or, alternatively audio data instead of features. Even when the optional feature stream is supplied, the standard ASR features are required for initial phonetic segmentation of acoustic data. The ASR system 220 can use the configuration parameters for model training and/or recognition accuracy evaluation. A decoder 228 evaluates the accuracy of the output from an acoustic model (AM) training module 224 and a language model (LM) training module 226 and returns a package 230 containing the AM model, the LM model, and optional recognition logs back to the client 204 in response to the API request. In one respect, the ASR system 220 can produce any kind of model for use with natural language, including models other than an acoustic model or a language model. The client 204 or other entity can use those models to recognize speech or perform other natural language processing tasks without additional input or assistance from the ASR system 220.

The AM training module 224 creates, estimates, and/or adapts an acoustic model on the textual data and the client's acoustic features training data supplied as part of the optional feature stream and the stream of standard ASR features. The LM training module 226 can estimate language models supplied through the textual data such as transcriptions. The ASR system 220 can generate recognizer outputs 230 from the client's test data.

This configuration allows the ASR system 220 to generate high-quality acoustic and/or language models for performing ASR on the client's data. This optimizes the performance of the speech processing service that the client wants to deploy and can provide a competitive advantage to the Engine Provider. Further, this approach can reduce the engine provider's costs. Software developers need only to maintain compatibility with the published API structure and definitions, without maintaining any kind of compatibility with the algorithms on the ASR system's side. Thus, the client can perform much of the application development in a way that makes sense for the client without burdening the server with those details and differences. Further, this separation between the client and the server eliminates concerns over sharing trade secrets, intellectual property, and/or proprietary information and algorithms because the API provides the client 204 access to particular sets of functionality on the ASR system 220 without exposing implementations of the functionality. Similarly, the ASR system 220 has no access to the client's data and algorithms. The client 204 and the ASR system can communicate via a secured or encrypted connection to ensure privacy of the data during transmission. In one aspect, the client and the ASR system 220 can operate according to a contractual agreement covering privacy of data processed in the ASR engine.

Figure 3:
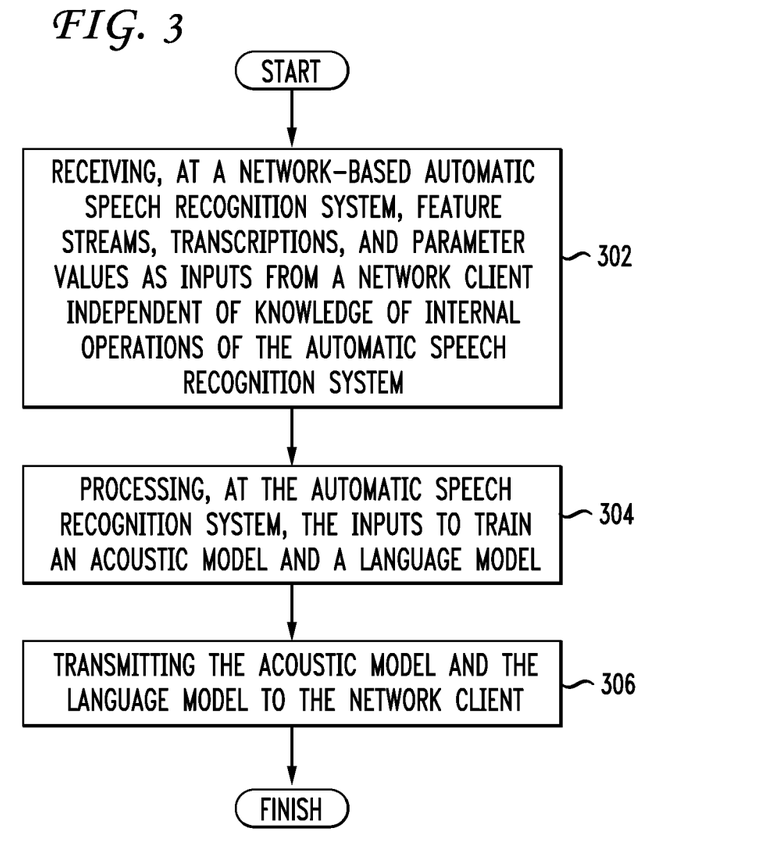
FIG. 3 illustrates an example method embodiment for the server side.
Figure 4:
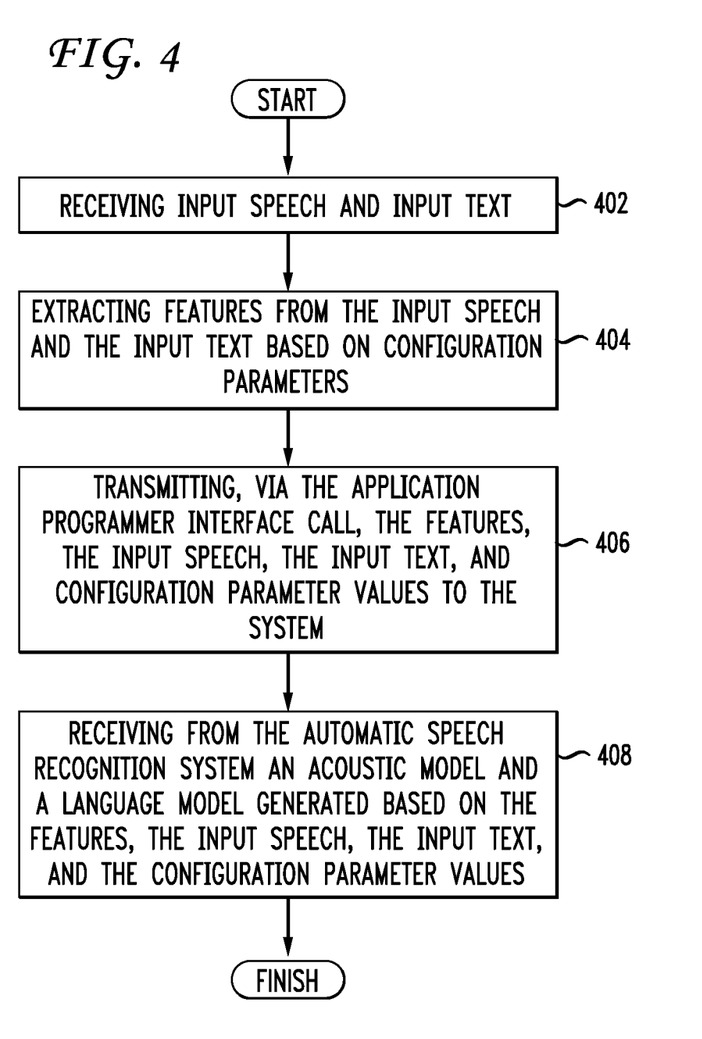
FIG. 4 illustrates an example method embodiment for the client side.

Having disclosed some basic system components, the disclosure now turns to the exemplary method embodiment shown in FIGS. 3 and 4. For the sake of clarity, the methods are discussed in terms of an exemplary system such as is shown in FIG. 1 configured to practice the methods. FIG. 3 illustrates a method of generating speech models for a remote client. The system implementing this method can be a network-based automatic speech recognition system. The system first receives a standard stream, transcriptions, and parameter values as inputs from a network client independent of knowledge of internal operations of the automatic speech recognition system (302) and/or optionally without direct access to the internal operations.

The system then processes the inputs to train an acoustic model (AM) and a language model (LM) (304) and transmits the acoustic model and the language model to the network client (306). Further, the system can process the inputs based on an algorithm for estimating an acoustic model, adapting an acoustic model, estimating a language model, generating recognizer outputs, and/or accuracy evaluation. The system can also generate a log describing the performance, problems, successes, settings, and other relevant information and metadata of the ASR system for the client to evaluate. For example, the logs may indicate that a particular part of the transcription caused problems in generating the language model. Then, after receiving the AM and LM and the log, the client can correct the transcriptions and resubmit all or part of the corrected transcriptions to the ASR system via the API.

FIG. 4 illustrates a method for a client device to interface with a system that generates models for use in automatic speech recognition via an application programming interface call over a network. The system receives input speech and input text (402). The client device can gather input speech and input text live or can select the speech and/or text from a database. In one scenario, the client device receives input speech and text targeted for a particular purpose, such as testing the creation of how a proposed interactive voice response system interacts with a particular ASR system vendor.

The system then extracts features from the input speech and the input text based on configuration parameters (404). The system transmits, via an API call, the features, the input speech, the input text, and configuration parameter values to the server (406). The configuration parameter values can indicate one or more specific task, application, or desired use for the requested models. The ASR server can process the input speech, text, features, and so forth for a significant amount of time. While many API calls in other applications may result in a near-instantaneous response, the server may take several hours, days, or longer to generate an AM and LM in response to the API call. Thus, the system may wait for a long time for the server to respond to the API call. In one variation, the client does not keep a constant communication channel open with the server, such as an HTTP or HTTPS session or other persistent session, while waiting for the response to the API call from the server.

The system receives from the automatic speech recognition system an acoustic model and a language model generated based on the features, the input speech, the input text, and the configuration parameter values (408). For example, the system can receive the models as part of the notification such as via an email attachment. As another example, the system can receive a notification from the server that the models are available via an FTP link or some other arrangement. In another variation, the acoustic model and/or the language model that the server provides to the client are limited duration, limited scope, or otherwise incomplete, but are sufficient to allow the client to test the quality, compatibility, or other attributes of the models. In one variation, the server and the client exchange the request and the response to the request via a secured connection that uses encryption, such as Hypertext Transfer Protocol Secure (HTTPS).

As part of a handshake or relationship initiation phase, the server and client can negotiate or establish a contractual agreement regarding privacy of at least one of the features, the input speech, the input text, and the configuration parameter values. While most proprietary information of one party is kept separate from the other party via the API "wall", some information is shared out of necessity. The contractual agreement is one way to handle this shared information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to generate models for other natural language applications. Those skilled in the art will readily recognize various modifications and changes that may be made to the principles described herein without following the example embodiments and applications illustrated and described herein, and without departing from the spirit and scope of the disclosure.

We claim:

1. A method comprising:
   receiving, at a network-based system configured to generate acoustic models and language models, inputs from a remote client via an application program interface, the inputs comprising:
   a feature stream of features extracted from speech processed by the remote client using a feature extraction algorithm which operates independent of the network-based system; and
a transcription of the speech;
generating an acoustic model according to an acoustic feature identified within the feature stream from the features extracted from the speech;
generating a language model according to the transcription; and
transmitting the acoustic model and the language model to the remote client.

2. The method of claim 1, wherein the inputs further comprise a set of parameter values describing settings of the feature extraction algorithm.

3. The method of claim 1, wherein the inputs further comprise a specific task for the acoustic model and the language model.

4. The method of claim 1, wherein the feature stream is further processed by the remote client using a baseline feature extraction program and a parameter value which sets feature extraction in the baseline feature extraction program.

5. The method of claim 1, further comprising processing the inputs prior to generation of the acoustic model and the language model according to an intervention from a human expert.

6. The method of claim 1, wherein the acoustic feature is specific to an individual.

7. The method of claim 1, wherein generating of the acoustic model and generating of the language model are further performed according to an algorithm for one of adapting the acoustic model, estimating the language model, generating recognizer outputs, and accuracy evaluation.

8. A system comprising:
a processor; and
a computer-readable storage medium having instructions stored which, when executed by the processor, cause the processor to perform operations comprising:
receiving, at a network-based system configured to generate acoustic models and language models, inputs from a remote client via an application program interface, the inputs comprising:
a feature stream of features extracted from speech processed by the remote client using a feature extraction algorithm which operates independent of the network-based system; and
a transcription of the speech;
generating an acoustic model according to an acoustic feature identified within the feature stream from the features extracted from the speech;
generating a language model according to the transcription; and
transmitting the acoustic model and the language model to the remote client.

9. The system of claim 8, wherein the inputs further comprise a parameter value indicating a specific task for the language model.

10. The system of claim 8, wherein the acoustic model and the language model are transmitted via a secured connection.

11. The system of claim 10, wherein the secured connection is encrypted.

12. The system of claim 8, the computer-readable storage medium having additional instructions stored which, when executed by the processor, result in operations comprising establishing a contractual agreement regarding privacy of the inputs.

13. The system of claim 8, the computer-readable storage medium having additional instructions stored which, when executed by the processor, result in operations comprising transmitting a log associated with the acoustic model and the language model.

14. The system of claim 13, wherein the log describes events associated with creation of the acoustic model and the language model.

15. The system of claim 8, the computer-readable storage medium having additional instructions stored which, when executed by the processor, cause the processor to perform operations comprising processing the inputs, prior to generation of the acoustic model and the language model, according to an intervention from a human expert.

16. The system of claim 15, wherein the processing of the inputs is according to an algorithm which estimates the acoustic model and the language model.

17. A computer-readable storage device having instructions stored which, when executed by a computing device, cause the computing device to perform operations comprising:
receiving, at a network-based system configured to generate acoustic models and language models, inputs from a remote client via an application program interface, the inputs comprising:
a feature stream of features extracted from speech processed by the remote client using a feature extraction algorithm which operates independent of the network-based system; and
a transcription of the speech;
generating an acoustic model according to an acoustic feature identified within the feature stream from the features extracted from the speech;
generating a language model according to the transcription; and
transmitting the acoustic model and the language model to the remote client.

18. The computer-readable storage device of claim 17, wherein the inputs further comprise a parameter value indicating a specific task for the language model.

19. The computer-readable storage device of claim 17, wherein the inputs further comprise a set of parameter values describing settings of the feature extraction algorithm.

20. The computer-readable storage device of claim 17, having additional instructions stored which, when executed by the computing device, cause the computing device to perform operations comprising establishing a contractual agreement with the remote client regarding privacy of the inputs.

* * * * *